(No Model.) 2 Sheets—Sheet 1.

C. E. TOWER.
SULKY PLOW.

No. 354,449. Patented Dec. 14, 1886.

Attest:
Walter Donaldson
Frank L. Middleton

Inventor:
Caleb E. Tower
by Joyce & Spear
Atty.

(No Model.) 2 Sheets—Sheet 2.

C. E. TOWER.
SULKY PLOW.

No. 354,449. Patented Dec. 14, 1886.

Attest:
Walter Donaldson
F. L. Middleton

Inventor:
Caleb E. Tower
by Myers Spear
Atty.

UNITED STATES PATENT OFFICE.

CALEB E. TOWER, OF SOUTH BEND, INDIANA, ASSIGNOR TO THE ECONOMIST PLOW COMPANY, OF SAME PLACE.

SULKY-PLOW.

SPECIFICATION forming part of Letters Patent No. 354,449, dated December 14, 1886.

Application filed June 10, 1886. Serial No. 204,873. (No model.)

*To all whom it may concern:*

Be it known that I, CALEB E. TOWER, of South Bend, in the county of St. Joseph and State of Indiana, have invented a new and useful Improvement in Sulky-Plows; and I do hereby declare that the following is a full, clear, and exact description of the same.

My invention relates to a brake for a sulky-plow, and it is particularly applicable to that style of plow in Letters Patent No. 313,749, granted to E. D. Meagher and myself on the 10th day of March, 1885, and known as a "tongueless sulky-plow"—that is, a riding-plow without a tongue; but it is obvious that the invention may be applied to plows other than to this particular plow with good results.

The object of the invention is to provide a brake for the rear or furrow wheel, ordinarily called a "revolving landside," this brake being intended to prevent the sulky from running upon the team when going downhill, and to aid in guiding when turning at the ends of the furrows.

The invention consists of a brake extending to and adapted to be applied to a revolving landside, with intermediate connections between the brake and the plow-beam and frame-bar, whereby the action of the beam is communicated thereto.

The invention further consists in details of construction, all as hereinafter fully set forth.

Figure 1:
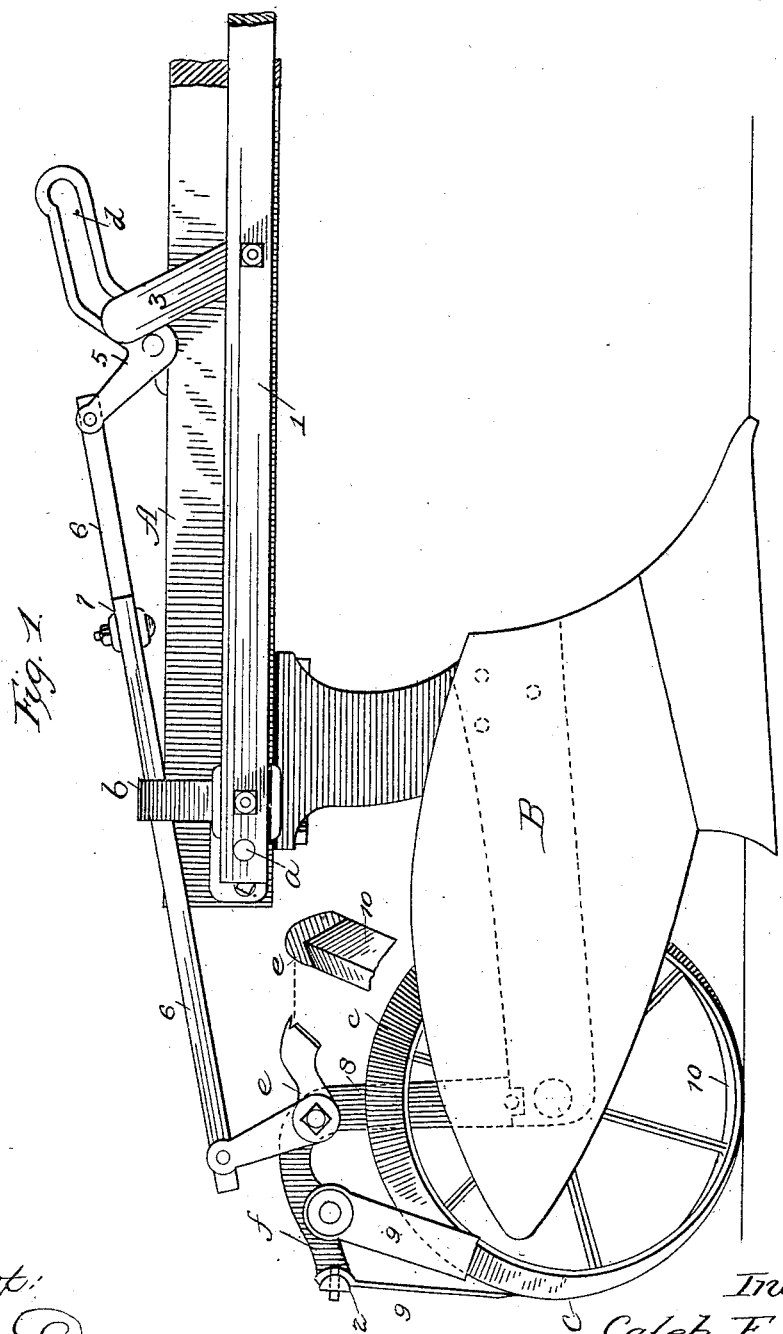
Figure 2:
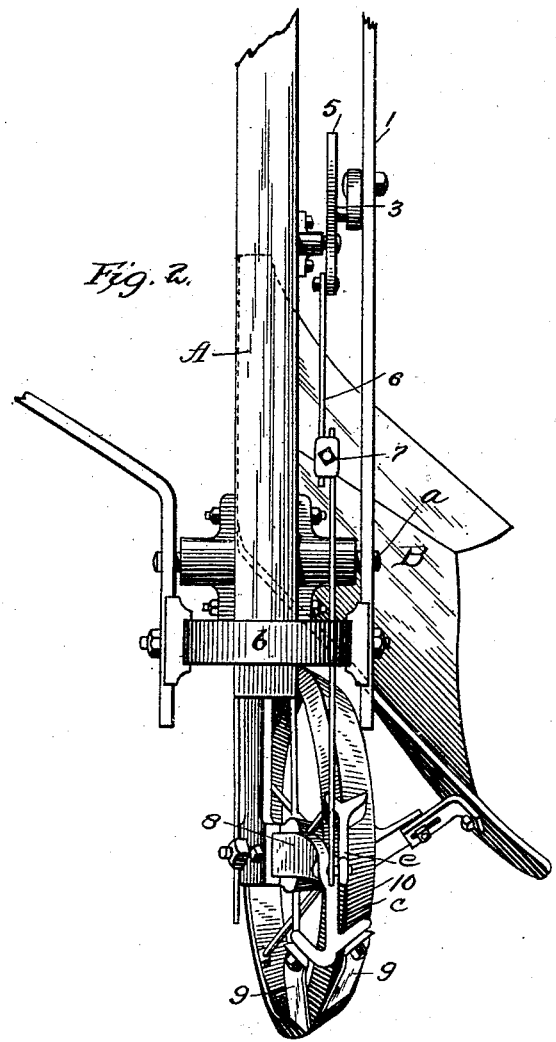

In the drawings, Figure 1 represents a side elevation and the rear part of the sulky-plow, such as that shown in the Letters Patent referred to, the wheels of the sulky and the front part thereto being omitted. Fig. 2 is a plan view of the rear furrow-wheel and a portion of the plow beam and frame, showing the brake and connecting parts.

A portion of the sulky represented in these drawings is the same as that shown in the patent referred to, and the plow, with its revolving landside, is similar to that shown in a patent granted to E. D. Meagher, dated February 7, 1882, No. 253,408; but it will be understood that while I have shown my invention applied to this particular form of sulky and revolving landside, I do not limit myself in this respect, as the brake may be applied with little change to a different form of sulky and to a different form of revolving landside.

A represents the plow-beam with the plow B rigidly secured thereto, the said beam being pivoted upon the side bars of the sulky at the point $a$, the said bars being connected by a yoke, $b$. The beam at its front end is guided vertically and has a limited amount of movement, as in the patent referred to. The revolving landside shown at 10 is suitably supported upon an arm projecting from the plow-standard, and is held in an inclined position and has an inclined face, $c$, running in the furrow, and it is upon this revolving landside which it is desired to apply the brake. An arm, 5, is pivoted to the plow-beam, and is formed something in the manner of a bell-crank lever having a short arm and a long arm, the long arm being bent and slotted, as shown at $d$. From the side bar, 1, a rigid arm, 3, extends upwardly at angles, and is provided with a stud upon its inner face, which is adapted to the slot $d$ in the arm 5. The part $d$ will be forced downward, when the plow-beam is raised, by means of the stud moving in the slot of the long arm, and the short arm forced upward and toward the front, for the purpose hereinafter explained. From the short arm of the part 5 a rod, 6, extends to the rear, this rod being formed in two parts, as shown at 7, so as to be adjustable, to be made longer or shorter. The rear end of this rod extends to a point directly over the revolving landside, and is attached to the long arm of the bell-crank lever $e$, which is pivoted upon a post, 8, extending upward from the arm that supports the hub of the rear furrow-wheel, and the short arm of this bell-crank lever constitutes the brake-shoe which is applied to the periphery of the revolving landside.

When the plow-beam is lifted, the arm $d$ of the part 5 is depressed, which draws upon the rod 6, and this movement is transferred through the bell-crank lever to the brake-shoe, which is thus applied to the periphery of the wheel and friction applied to retard the revolution thereof.

While I have shown the brake-shoe as having a V-shaped notch adapted to fit over the extreme upper edge of the peculiar-shaped revolving landside shown, it will be understood that the form of shoe may be changed to correspond with a different form of landside, and it may be applied to the side, as shown. When the plow-beam is raised to its full height, therefore, the pressure is on the wheel 10, which cannot revolve, and in this position the plow is out of the ground. When the beam is lowered, however, to force the point of the plow into the ground, the action of the brake is reversed and the pressure is taken off the wheel 10, so that it may be revolved.

The adjustment of the rod 6 at the point 7 renders it capable of governing the action of the brake before starting out in the field, so that more or less pressure may be applied by a given movement of the lever, and it may be made to act in a greater or less time.

Formed integral with the post 8, or connected thereto in any suitable way, is an angular projection, $f$, which extends out toward the rear of the wheel 10, and at two points upon this projection are scrapers 9, which may be held thereto by any suitable means, a ball-and-socket connection being shown at 2. One of these scrapers is at the extreme projection of 8, and the other is held at an angle, so as to correspond with the incline of the wheel 10, so that one scraper tends to keep the edge of the wheel clear, while the other clears the inclined face of the said wheel.

It will be understood, of course, that with a different form of landside scrapers will be arranged differently. These scrapers clean off the accumulation of earth upon the tire of the wheel, which is considerable in some soils, and the plow is thus allowed to run flat. If the soil is not removed, it causes the plow to run on the front edge of its point, resulting in heavy draft and bad work. The arm for supporting the back furrow-wheel and scrapers may be made in any desired shape, and may be made in more than one piece, if found necessary.

I am aware that a brake has been heretofore used upon a rear furrow-wheel, the said brake being connected to an independent operating-treadle, the furrow-wheel also being mounted independently of the plow, and I do not broadly claim such as my invention.

I claim as my invention—

1. In combination with a sulky-plow having a revolving landside, a brake for said landside, and connections between said brake and the plow-beam and frame-bar, and suitable means for operating the plow-beam, whereby the action thereof is communicated to the brake, substantially as described.

2. In combination with a sulky-plow having a revolving landside, a brake for said landside, connections between said brake and an arm on the plow-beam, means for adjusting the plow-beam vertically, and a rigid connection between the arm on the plow-beam and the side bar of the sulky-frame, whereby the action of the driver in adjusting the beam will operate the brake, substantially as described.

3. In combination with a sulky-plow having a revolving landside, a brake pivoted upon the standard above the wheel, a rod connecting said brake with a lever on the plow-beam, and an arm, 3, rigidly secured to a side bar of the sulky at one end, and having a stud upon its opposite end working in the slotted end of the lever upon the beam, and means for adjusting the beam, substantially as described.

4. In combination with a sulky-plow having a revolving landside, a brake therefor, an adjustable rod, 6, connecting said brake with a slotted lever upon the plow-beam, a rigid connection between said lever and the side bar of the sulky, and means for adjusting the sulky-beams, substantially as described.

In testimony whereof I have signed my name to this specification in the presence of two subscribing witnesses.

CALEB E. TOWER.

Witnesses:
LEIGHTON PINE,
HAMPTON D. SILL.